United States Patent
Dötschel et al.

(10) Patent No.: US 12,253,145 B2
(45) Date of Patent: Mar. 18, 2025

(54) TRANSMISSION FOR A VEHICLE, AND POWER TRAIN HAVING SUCH A TRANSMISSION

(71) Applicant: ZF Friedrichshafen AG, Friedrichshafen (DE)

(72) Inventors: Philip Dötschel, Friedrichshafen (DE); Tamas Gyarmati, Bermatingen (DE); Matthias Reisch, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/543,557

(22) Filed: Dec. 18, 2023

(65) Prior Publication Data

US 2024/0200637 A1  Jun. 20, 2024

(30) Foreign Application Priority Data

Dec. 19, 2022 (DE) ............. 10 2022 213 921.6

(51) Int. Cl.
*F16H 3/66* (2006.01)
*F16H 57/08* (2006.01)

(52) U.S. Cl.
CPC ........... *F16H 3/666* (2013.01); *F16H 57/082* (2013.01); *F16H 2200/2007* (2013.01)

(58) Field of Classification Search
CPC . F16H 3/666; F16H 57/082; F16H 2200/2007
See application file for complete search history.

(56) References Cited

U.S. PATENT DOCUMENTS

| | | | |
|---|---|---|---|
| 5,718,300 A | 2/1998 | Frost | |
| 5,845,732 A * | 12/1998 | Taniguchi | B60K 17/16 180/65.6 |
| 2013/0324354 A1* | 12/2013 | Phebus | F16H 1/46 475/331 |

(Continued)

FOREIGN PATENT DOCUMENTS

| | | |
|---|---|---|
| DE | 102013215877 B4 | 6/2016 |
| DE | 102017212781 A1 | 1/2019 |

(Continued)

OTHER PUBLICATIONS

German Search Report for Application No. 102022213921.6 dated Dec. 1, 2023.

*Primary Examiner* — Jacob S. Scott
*Assistant Examiner* — Farhana Pervin
(74) *Attorney, Agent, or Firm* — Dority & Manning, P.A.

(57) ABSTRACT

A transmission includes an input shaft, two output shafts, at least three bearings and a differential. A first planetary gear set includes multiple gear set elements, and a second planetary gear set includes multiple gear set elements and is operatively connected to the first planetary gear set. A first output torque is at least indirectly transmittable onto the first output shaft by the first planetary gear set. One of the three bearings is arranged between the second output shaft and a stationary component and delimits the axial position of the second output shaft with respect to the stationary component at least in one axial direction. The second gear set element of the first planetary gear set is axially fixed at least in one axial direction on the first output shaft.

17 Claims, 5 Drawing Sheets

Fig. 2

(56) References Cited

U.S. PATENT DOCUMENTS

| | | | | |
|---|---|---|---|---|
| 2014/0141918 A1* | 5/2014 | Fukami | ............... | B60K 17/165 |
| | | | | 475/150 |
| 2015/0219193 A1* | 8/2015 | Nitsch | ................... | F16H 37/046 |
| | | | | 475/219 |
| 2020/0263768 A1* | 8/2020 | Nanahara | .............. | F16D 55/226 |
| 2021/0018069 A1* | 1/2021 | Conlon | ................... | F16H 48/05 |
| 2022/0195898 A1* | 6/2022 | Van Weelden | .......... | F16H 57/08 |

FOREIGN PATENT DOCUMENTS

| | | | | |
|---|---|---|---|---|
| DE | 102021200523 A1 | 7/2022 | | |
| WO | WO-2005120877 A1 * | 12/2005 | ............. | B60K 17/16 |

* cited by examiner

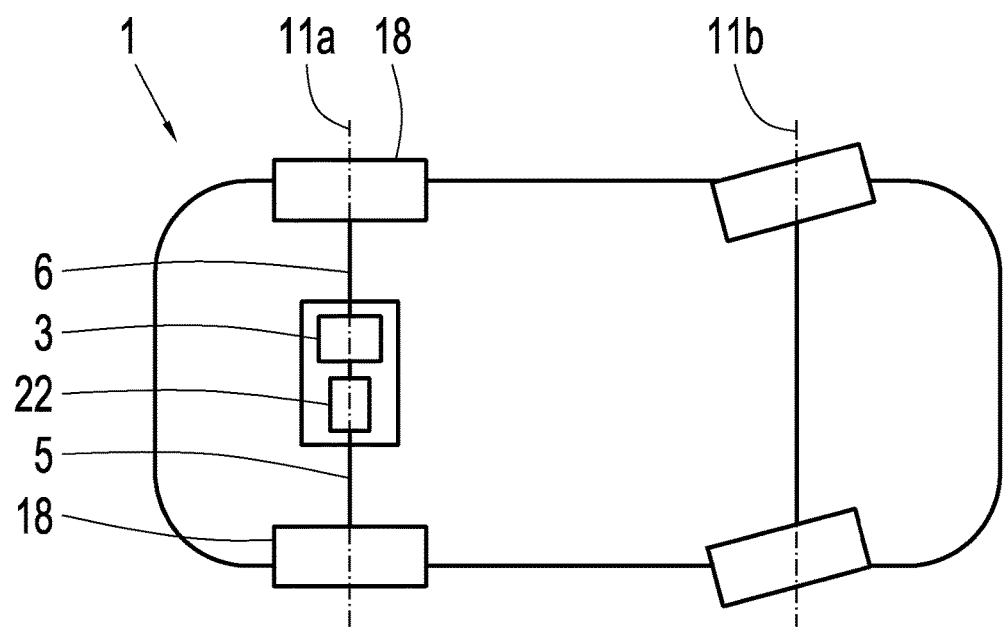
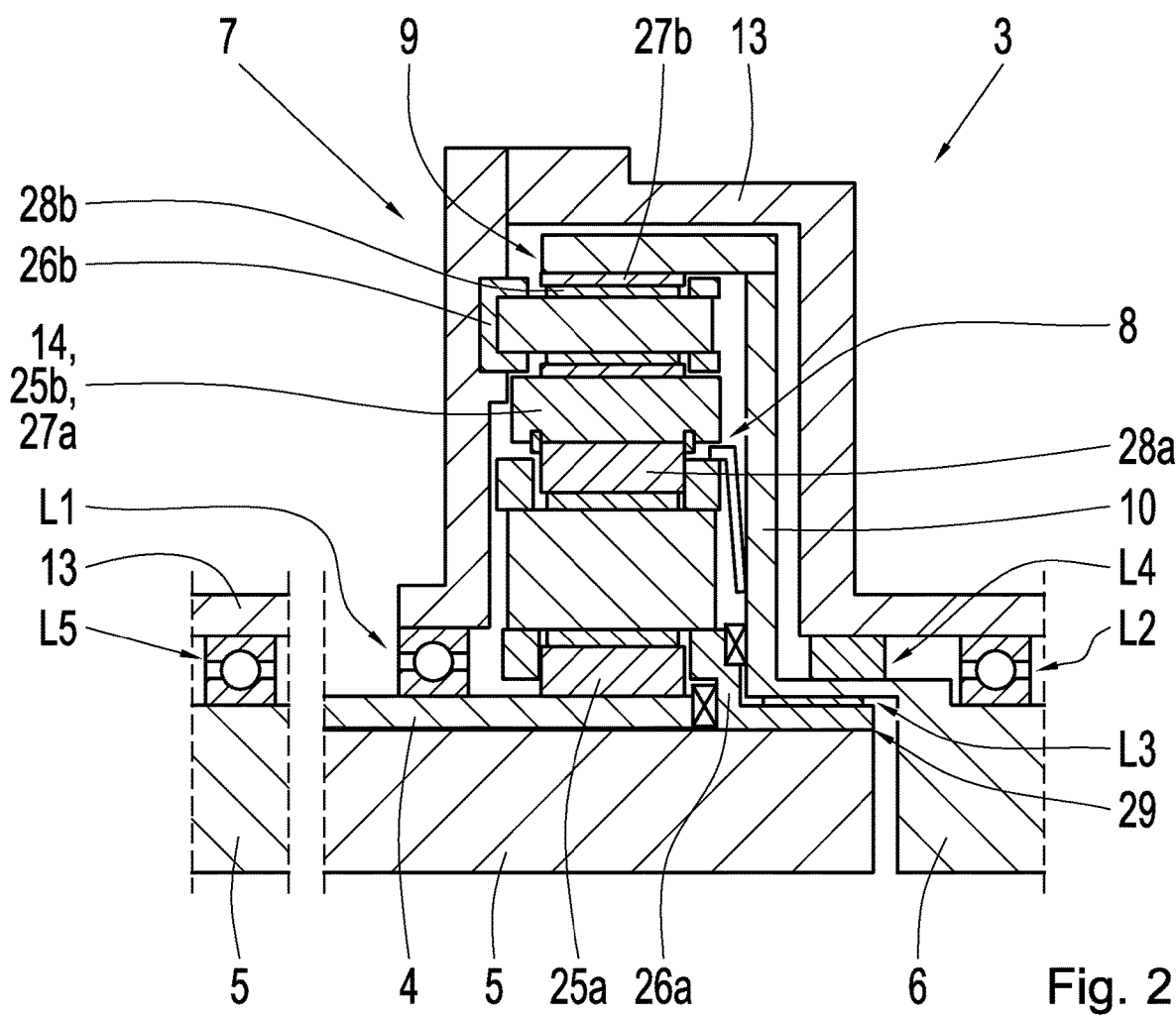
Fig. 1
Fig. 2

TRANSMISSION FOR A VEHICLE, AND POWER TRAIN HAVING SUCH A TRANSMISSION

CROSS-REFERENCE TO RELATED APPLICATION

The present application is related and has right of priority to German Patent Application No. DE102022213921.6 filed on Dec. 19, 2022, which is incorporated by reference in its entirety for all purposes.

TECHNICAL FIELD

The invention relates generally to a transmission for a power train of a vehicle and to a power train having such a transmission.

BACKGROUND

DE 10 2013 215 877 B4 relates to an epicyclic gear train for branching the drive power applied at a power input to a first power output and to a second power output in conjunction with reducing the output rotational speed to a rotational speed level that is below the input rotational speed at the power input. The epicyclic gear train has a first planetary gear stage, which includes a first sun gear, a first planetary gear set, a first planet carrier and a first ring gear. The epicyclic gear train also has a second planetary gear stage, which includes a second sun gear, a second planetary gear set, a second planet carrier and a second ring gear. The epicyclic gear train also has a third planetary gear stage, which includes a third sun gear, a third planetary gear set, a third planet carrier and a third ring gear. The first sun gear acts as a power input, wherein the first planet carrier is connected to the second sun gear for conjoint rotation. The second planet carrier is fixed in position, the first ring gear is connected to the third sun gear for conjoint rotation and the third ring gear is connected to the second planet carrier for conjoint rotation. A first power output is brought about via the third planetary gear stage, wherein a second power output is brought about via the second ring gear of the second planetary gear stage.

In transmissions of this type, it is typical to axially support and rotatably mount the planet carrier of the first planetary gear set with respect to other components in the transmission or with respect to the housing by one or multiple axial bearing(s). This requires more installation space, the relevant components must be machined in a complex manner, and the assembly of the transmission is made difficult.

BRIEF SUMMARY

Example aspects of the present invention provide a space-saving transmission for a power train of a vehicle that gets by with fewer bearing elements, in particular fewer axial bearings.

A transmission according to example aspects of the invention for a power train of a vehicle has an input shaft, a first output shaft, a second output shaft, a first bearing, a second bearing, a third bearing and a differential, which is operatively arranged between the input shaft and the two output shafts, wherein the differential has a first planetary gear set, which includes multiple gear set elements, and a second planetary gear set, which includes multiple gear set elements and is operatively connected to the first planetary gear set. A first output torque is at least indirectly transmittable onto the first output shaft by the first planetary gear set. A support torque of the first planetary gear set is convertible in the second planetary gear set such that a second output torque corresponding to the first output torque is transmittable onto the second output shaft. A first gear set element of the first planetary gear set is connected to the input shaft for conjoint rotation. A second gear set element of the first planetary gear set is at least indirectly connected to the first output shaft for conjoint rotation. A third gear set element of the first planetary gear set is at least indirectly connected to a first gear set element of the second planetary gear set for conjoint rotation. A second gear set element of the second planetary gear set is connected to a stationary component for conjoint rotation. A third gear set element of the second planetary gear set is at least indirectly connected to the second output shaft for conjoint rotation. the second bearing is arranged between the second output shaft and the stationary component and delimits the axial position of the second output shaft with respect to the stationary component at least in one axial direction. The second gear set element of the first planetary gear set is axially fixed at least in one axial direction on the first output shaft. The second output shaft is therefore mounted for rotation with respect to the stationary component by the second bearing.

When a shaft is mounted or fixed with respect to another shaft or a component, the shaft is mounted or fixed on the other shaft or on the component at least indirectly, i.e., either directly or via at least one further component. In other words, the shaft is not mounted or fixed spatially with respect to, but rather in relation to, i.e., with regard to the other shaft or the component.

For example, the input shaft is mounted for rotation with respect to the stationary component by the first bearing and/or the first output shaft is mounted for rotation with respect to the stationary component by the third bearing. The first bearing is preferably a fixed bearing. The second bearing is preferably a fixed bearing. The third bearing is preferably a fixed bearing. For example, the first, the second and the third bearings are fixed bearings.

According to one preferred example embodiment, the input shaft is mounted for rotation with respect to the stationary component by the first bearing. Alternatively or additionally, the first output shaft is mounted for rotation with respect to the stationary component by the third bearing. For example, the input shaft is mounted for rotation with respect to the stationary component by the first bearing, wherein the second output shaft is mounted for rotation with respect to the stationary component by the second bearing, wherein the first output shaft is mounted for rotation with respect to the stationary component by the third bearing.

When the two output shafts are axially fixed on both sides, no axial forces are introduced into the transmission via side shafts or via the chassis. When the two output shafts are axially fixed on one side, assembly can be simplified and installation space can be reduced. In particular, fasteners, such as, for example, circlips, can be dispensed with.

Due to the axial fixation of the second gear set element of the first planetary gear set and the targeted mounting of the input shaft, of the first output shaft and of the second output shaft by fixed bearings in each case, the otherwise typical number of axial bearings for axially supporting the second gear set element of the first planetary gear set can be reduced. Axial bearings can be omitted entirely depending on the design of the axial fixation.

The second gear set element in the first planetary gear set is preferably not mounted or axially supported, or is mounted or axially supported only with a single axial bearing, with respect to the input shaft and/or with respect to the third gear set element in the second planetary gear set and with respect to the second output shaft. An integral differential is therefore provided without axial bearings, or with fewer axial bearings, for mounting the second gear set element of the first planetary gear set. The differential is therefore an integral differential. As a result, a transmission is realized that has reduced losses and higher efficiency. The omission of bearing elements and bearing points also positively affects the production and assembly costs as well as the installation space. Therefore, the transmission can be made more compact. Furthermore, the transmission can be more easily assembled, because there are fewer bearings to install and bearing seats are dispensed with. In addition, the design of the transmission oil supply and the transmission lubrication is simpler, since fewer bearings need to be lubricated and cooled.

By axially fixing the second gear set element of the first planetary gear set, the second gear set element in the first planetary gear set cannot be axially displaced with respect to the further gear set elements in the first planetary gear set and with respect to the first output shaft, in particular when axially acting meshing forces arise. The second gear set element in the first planetary gear set is therefore arranged in an axially fixed manner in relation to the first output shaft.

In this type of transmission, the two wheel torques are not combined to form a single axle torque in a component. Instead, the drive power introduced into the input shaft is divided in the integral differential and applied onto the output shafts operatively connected to the planetary gear sets in accordance with the design and the connection of the planetary gear sets. As a result, the components in the integral differential can be more slender due to the respective, relatively low torques they have to accommodate. This also results in smaller components and a weight reduction. A transmission is therefore provided, which both converts and distributes the torque by the integral differential, which previously required two separate assemblies instead of a single, integral assembly. Example aspects of the invention therefore provide a combined transmission and differential, which converts as well as distributes torque onto the output shafts, wherein power distribution is also achieved.

An integral differential is understood in the framework of example aspects of this invention to be a differential that has both a first planetary gear set and a second planetary gear set operatively connected to the first planetary gear set, wherein the first planetary gear set is drivingly connected to the input shaft, to the second planetary gear set and at least indirectly to the first output shaft. The second planetary gear set is drivingly connected to the second output shaft. The input torque to the input shaft is convertible by such an integral differential and is distributable and transmittable at a defined ratio onto the two output shafts. Preferably, fifty percent (50%), i.e., one half, of the input torque is transmitted onto each of the output shafts. Therefore, the differential does not have a component that is subjected to both output torques. In other words, the two torques are never combined. Furthermore, the differential has no gears that rotate in a block, or without a rolling motion, when the output rotational speeds of the output shafts are identical. Consequently, the intermeshed components in the differential always rotate in relation to one another, independently of the output rotational speeds of the output shafts. The output shafts of the transmission are designed, in particular, to be operatively connected to a wheel on the vehicle. The particular output shaft can be connected to the associated wheel directly or indirectly, i.e., via, for example, a joint and/or a wheel hub.

The integral differential is therefore in the form of a planetary transmission having two planetary gear sets and the gear set elements sun gear, ring gear and multiple planet gears guided by a planet carrier on a circular path around the sun gear. A "planetary gear set" is understood to be a unit that includes a sun gear, a ring gear and multiple planet gears guided by a planet carrier on a circular path around the sun gear, wherein the planet gears are meshed with the ring gear and the sun gear.

Bearing elements in the form of fixed bearings are provided for accommodating axial forces in both directions. In addition to the axial forces, the fixed bearing also absorbs radial forces and transfers these onto adjacent components. In particular, the meshing forces from the helical-cut gear set elements of the planetary gear sets are absorbed and transferred by the fixed bearings. No axial or radial play arises on the fixed bearing. The axial position of the mounted component is precisely defined by the fixed bearing, in particular under load. In addition, the movement of the particular component supported by the fixed bearing is highly precise. The fixed bearing has one or multiple ball bearing(s), in particular anti-friction bearings. The particular fixed bearing is preferably in the form of a single-row grooved ball bearing. Floating bearings, as compared to fixed bearings, are designed only for absorbing and transferring radial forces. These can be needle bearings or cylindrical roller bearings without ribs.

A stationary component is understood to be a rotationally and axially fixed component in the transmission, for example, the transmission housing. The stationary component can therefore be arranged in a housing-fixed manner. The term "housing-fixed" is understood to mean that relative motion does not takes place or cannot take place between the particular housing-fixed gear set element and the stationary component of the transmission.

The input shaft is preferably designed to be at least indirectly connected to a drive shaft in a drive unit for conjoint rotation. The drive unit generates drive power that is transmitted onto the input shaft via the drive shaft. The drive shaft of the drive unit can be connected to the input shaft for conjoint rotation. Alternatively, the drive shaft and the input shaft are a coherent or one-piece component. Depending on the design of the power train, two or more input shafts can also be provided, in particular when the power train is a hybridized power train and, therefore, two or more drive units are provided.

The input shaft is preferably a hollow shaft. As a result, one of the output shafts, preferably the first output shaft, can fit axially inside the input shaft. One of the output shafts, in particular the first output shaft, preferably extends through the transmission and potentially through the drive unit in the power train. The particular output shaft therefore extends through the transmission "inline" for transmitting drive power onto the wheel that is operatively connected to the particular output shaft. In this case, the output shafts are advantageously coaxial to one another. Due to the coaxial arrangement of the output shafts, a radially slender design of the transmission can be realized. It is also conceivable to arrange the output shafts in parallel to and offset from each other.

A "shaft" is understood to be a rotatable component in the transmission with which various components in the transmission are connected to one another for conjoint rotation. The particular shaft can connect the components to one another axially or radially or also both axially and radially. A shaft is not to be understood exclusively to be a, for example, cylindrical, rotatably mounted machine element for transmitting torques, but rather a shaft is also understood to refer to general connecting elements that connect individual components or elements to one another, in particular, connecting elements that connect multiple elements to one another for conjoint rotation.

If two components in the transmission are "connected or coupled for conjoint rotation," this means, as set forth in example aspects of the invention, that there is a permanent connection between components, such that the two components cannot rotate independently of each other. This is therefore also understood to be a permanent rotary joint. In particular, there are no shifting elements between the two components, which can be elements in the differential, and/or shafts, and/or a nonrotating component in the transmission, but instead, the two components are permanently coupled to each other. An elastically rotating connection between two components is also understood to be permanent, or such that the two elements rotate conjointly.

The first planetary gear set is preferably arranged, at least in part, radially inside the second planetary gear set. The planetary gear sets of the integral differential are therefore radially nested. The gear set elements in the first and the second planetary gear sets are therefore axially located in a common plane. The first and the second planetary gear sets are preferably located substantially in a common wheel plane, enabling the transmission to be axially shorter and, therefore, particularly compact. The first planetary gear set and the second planetary gear set are arranged radially above each other. It is also conceivable that the first and the second planetary gear sets are not arranged in a common plane, and instead the first planetary gear set is offset in the axial direction with respect to the second planetary gear set.

The third gear set element in the second planetary gear set is preferably coupled to the second output shaft for conjoint rotation via a coupling element. The coupling element transmits drive power between the third gear set element in the second planetary gear set and the second output shaft. For the case in which the third gear set element in the second planetary gear set is the ring gear in the second planetary gear set, the coupling element is understood to be a ring gear carrier which transmits drive power from the third gear set element onto the second output shaft.

Further preferably, the second gear set element in the first planetary gear set is mounted via a radial bearing for rotation at least indirectly with respect to the second output shaft. The radial bearing supports the first output shaft in the radial direction with respect to the second output shaft, or vice versa. The radial bearing can be in the form of a needle bearing or a plain bearing in order to save installation space.

In addition, the second gear set element in the first planetary gear set is preferably connected to the first output shaft for conjoint rotation via a driving tooth system or the like. In this sense, the first output shaft is arranged radially inside the second gear set element in the first planetary gear set, or vice versa. Torque transmission without play, in particular under load, is achieved in this way.

According to one exemplary embodiment, a snap ring for axially fixing the second gear set element of the first planetary gear set is arranged radially between the second gear set element in the first planetary gear set and the first output shaft. The snap ring is preferably arranged in the area of the driving tooth system. The snap ring prevents an axial relative motion between the second gear set element in the first planetary gear set and the first output shaft. The snap ring can be partially accommodated in an appropriate groove or recess in the second gear set element in the first planetary gear set and/or in the first output shaft.

Alternatively or additionally, the second gear set element in the first planetary gear set is axially fixed on the first output shaft by at least one retaining ring. A retaining ring is understood to be a snap ring, which has an annular body without an assembly opening or the like, as well as a circlip, which usually has two assembly openings. Furthermore, the particular retaining ring can be in the form of an inner retaining ring for installation in a bore or in a hollow shaft. Alternatively, the retaining ring can be in the form of an outer retaining ring for installation on a shaft.

A first retaining ring is preferably accommodated in a first groove formed on the first output shaft, wherein the second gear set element in the first planetary gear set is axially supported against the first retaining ring. For this purpose, the first retaining ring is arranged radially outwards on the first output shaft. The first retaining ring supports axial forces between the second gear set element in the first planetary gear set and the first output shaft, wherein the second gear set element in the first planetary gear set and the first output shaft come to rest axially against each other due to axially acting meshing forces. A second retaining ring can also be arranged on the first output shaft in order to axially fix the second gear set element of the first planetary gear set in both directions.

Further alternatively or additionally, a second retaining ring is accommodated in a second groove, which is formed on the second gear set element in the first planetary gear set, wherein the second gear set element in the first planetary gear set is axially supported against the first output shaft via the second retaining ring. The second retaining ring also supports axial forces between the second gear set element in the first planetary gear set and the first output shaft. For this purpose, the second retaining ring is arranged radially inwards on the second gear set element in the first planetary gear set.

Provided that two retaining rings are provided, a preferably axial section of the second gear set element in the first planetary gear set is arranged in an axially-fixed manner between the two retaining rings, such that the second gear set element in the first planetary gear set is fixed axially in relation to the first output shaft and a relative motion between the two components is prevented.

According to one further example embodiment, an at least partially circumferential first shoulder is formed on the first output shaft, against which first shoulder the second gear set element in the first planetary gear set is axially supported. The first shoulder can be provided in place of the first retaining ring. As a result, the assembly of the transmission is simplified, since there is no need for an additional groove or an additional component as a retaining ring. In other words, the first output shaft has a first section with a first outer diameter and a second section with a second outer diameter, which differs from the first outer diameter, wherein the transition between the two sections is formed as the first shoulder.

Alternatively, an at least partially circumferential second shoulder is formed on the second gear set element in the first planetary gear set and comes to rest via an end face against the first output shaft. As a result, the second gear set element in the first planetary gear set is axially supported against the first output shaft. The second shoulder can be provided in place of the second retaining ring. As a result, the assembly of the transmission is also simplified, since there is no need for an additional groove or an additional component as a retaining ring. The second shoulder can be formed via plastic deformation of the second gear set element in the first planetary gear set.

Further alternatively, an at least partially circumferential third shoulder is formed on the second gear set element in the first planetary gear set, the third shoulder coming to rest axially at least indirectly against the second output shaft. A sliding surface is formed on the second output shaft, against which sliding surface the second gear set element in the first planetary gear set axially comes to rest or is axially supported and can glide off in the circumferential direction. The sliding surface therefore acts as a sliding surface and an axial stop surface.

The above-described different example design options of the axial fixation of the second gear set element in the first planetary gear set can be arbitrarily combined with one another, where appropriate, depending on the requirement.

In principle, the planetary gear sets in the transmission, in particular in the integral differential and the epicyclic gear train, can be arbitrarily arranged with respect to one another and arbitrarily operatively connected to one another in order to implement a desired gear ratio. According to one example embodiment, the first gear set element is a sun gear in the particular planetary gear set, the second gear set element is a planet carrier in the particular planetary gear set and the third gear set element is a ring gear in the particular planetary gear set. The input shaft is therefore connected to the sun gear in the first planetary gear set for conjoint rotation, wherein the planet carrier in the first planetary gear set is connected to the first output shaft for conjoint rotation, and wherein the ring gear in the first planetary gear set is at least indirectly connected to the sun gear in the second planetary gear set for conjoint rotation. In particular, the ring gear in the first planetary gear set is connected to the sun gear in the second planetary gear set for conjoint rotation via a coupling shaft. The input shaft and the sun gear in the first planetary gear set can be formed as one piece.

Furthermore, in this sense, the planet carrier in the second planetary gear set is fixed in position, for example, at a housing, wherein the ring gear in the second planetary gear set is connected to the second output shaft for conjoint rotation. The connection of the gear set elements between the planetary gear sets can be arbitrarily interchanged depending on the requirement on the ratios. Further components, for example, intermediate shafts or coupling shafts, can also be arranged between the aforementioned components, i.e., the gear set elements in the planetary gear sets.

The particular planetary gear set is preferably a negative planetary gear set or a positive planetary gear set. A negative planetary gear set corresponds to a planetary gear set with a planet carrier, on which first planet gears are rotatably mounted, and with a sun gear and a ring gear, wherein the teeth on at least one of the planet gears meshes with the teeth on the sun gear as well as with the teeth on the ring gear, whereby the ring gear and the sun gear rotate in opposite directions when the sun gear rotates while the carrier is held. A positive planetary gear set differs from the negative planetary gear set in that the positive planetary gear set has first and second or inner and outer planet gears which are rotatably mounted on the planet carrier. The teeth of the first or inner planet gears mesh with the teeth of the sun gear and with the teeth of the second or outer planet gears. In addition, the teeth of the outer planet gears mesh with the teeth of the ring gear. As a result, the ring gear and the sun gear rotate in the same direction when the planet carrier is held.

In the design of one or more of the planetary gear sets as a positive planetary gear set, the connection of the planet carrier and the ring gear is interchanged and the absolute value of the stationary transmission ratio is increased by one (1). Correspondingly, this is also possible the other way around when a negative planetary gear set is to be provided in place of a positive planetary gear set.

Alternatively, it is also conceivable to form one or multiple planetary gear set(s) as a stepped planetary gear set or stepped planetary gear sets. Each stepped planetary gear of the particular stepped planetary gear set preferably has a first gearwheel with a second gearwheel, which is connected thereto for conjoint rotation. The first gearwheel is preferably meshed, for example, with the sun gear and the second gearwheel is therefore meshed with the ring gear, or vice versa. These two gearwheels can be connected to one another for conjoint rotation, for example, via an intermediate shaft or a hollow shaft. In the case of a hollow shaft, the hollow shaft can be rotatably mounted on a pin of the planet carrier. The two gearwheels in the particular stepped planetary gear preferably have different diameters and numbers of teeth in order to set a gear ratio. Composite planetary gear sets are also conceivable.

The term "operatively connected" is understood to be a permanent connection between two components, the permanent connection being provided for permanently transmitting drive power, in particular rotational speed and/or torque. The connection can be implemented directly or via a fixed ratio. The connection can be implemented, for example, via a fixed shaft, gear teeth, in particular on a spur gear, and/or with a belt.

The term "at least indirectly" is understood to mean that two components are (operatively) connected to one another via at least one other component, located between the two components, or that the two components are directly connected to one another. Other components can also be arranged between shafts or gear wheels, which are operatively connected to the shaft or to the gear wheel.

Further interconnected components can be arranged between the input shaft and the drive unit, which are formed, for example, as a planetary transmission, a spur gear drive, a sprocket, a belt drive, a bevel gear, a universal joint shaft, a torsional shock absorber, a multi-speed transmission or the like. Further interconnected components can also be arranged between the particular output shaft and the wheel operatively connected thereto, such as, for example, universal joint shafts, transmission gearing, spring and damping elements or the like.

A power train according to example aspects of the invention for a vehicle includes a transmission as described above. The transmission is operatively connected to a drive unit. The drive unit is preferably an electric machine, wherein the input shaft of the transmission is a rotor of the electric machine or is connected or coupled to the rotor or to a rotor shaft for conjoint rotation. The rotor is mounted for rotation with respect to a housing-fixed stator in the electric machine. The electric machine is preferably connected to an accumulator, which supplies the electric machine with electrical energy. The electric machine is also preferably controllable by way of an open-loop or closed-loop system by a power electronics system. The drive unit can also be an internal combustion engine, wherein, in this case, the input shaft is, for example, a crankshaft, or is connected or coupled to the crankshaft for conjoint rotation.

The drive unit is preferably coaxial to the integral differential. An additional speed change from the input shaft onto the rotor shaft or onto the rotor or onto the crankshaft of the drive unit is therefore not necessary. One of the output shafts axially extends through the drive unit in this case.

The drive unit is preferably axially arranged between the third fixed bearing and the rest of the transmission. In other words, the first output shaft is mounted only on the opposite side of the drive unit with respect to the stationary component via the third fixed bearing.

The power train of the type described above is usable in a vehicle. The vehicle is preferably a motor vehicle, in particular an automobile (for example, a passenger car weighing less than three and a half (3.5) tons), a bus, or a truck (busses and trucks can weigh more than three and a half (3.5) tons). In particular, the vehicle is an electric vehicle or hybrid vehicle. The vehicle has at least two axles, wherein one of the axles is formed by an axle that is drivable by the power train. The power train according to example aspects of the invention is operatively arranged on this drivable axle and the power train transmits drive power from the drive unit onto the wheels on this axle via the transmission according to example aspects of the invention. It is also conceivable that there is a separate power train of this type for each axle. The power train is preferably front-wheel drive, in which the input shaft and the output shafts are substantially transverse to the longitudinal axis of the vehicle. Alternatively, the power train can be at an angle to the longitudinal and lateral axes of the vehicle, wherein the output shafts are connected to the wheels on the particular axle with joints that are transverse to the longitudinal axis of the vehicle.

The above definitions and explanations of technological effects, advantages and advantageous example embodiments of the transmission according to example aspects of the invention also apply analogously to the power train according to example aspects of the invention, and vice versa.

BRIEF DESCRIPTION OF THE DRAWINGS

Multiple example embodiments of the invention are explained in greater detail in the following with reference to the schematic drawings. Therein:

FIG. 1 shows a highly schematic top view of a vehicle with a power train according to example aspects of the invention and a transmission according to example aspects of the invention in one preferred example embodiment;

FIG. 2 shows a highly schematic longitudinal section of the transmission according to example aspects of the invention in FIG. 1;

DETAILED DESCRIPTION

Figure 3A:
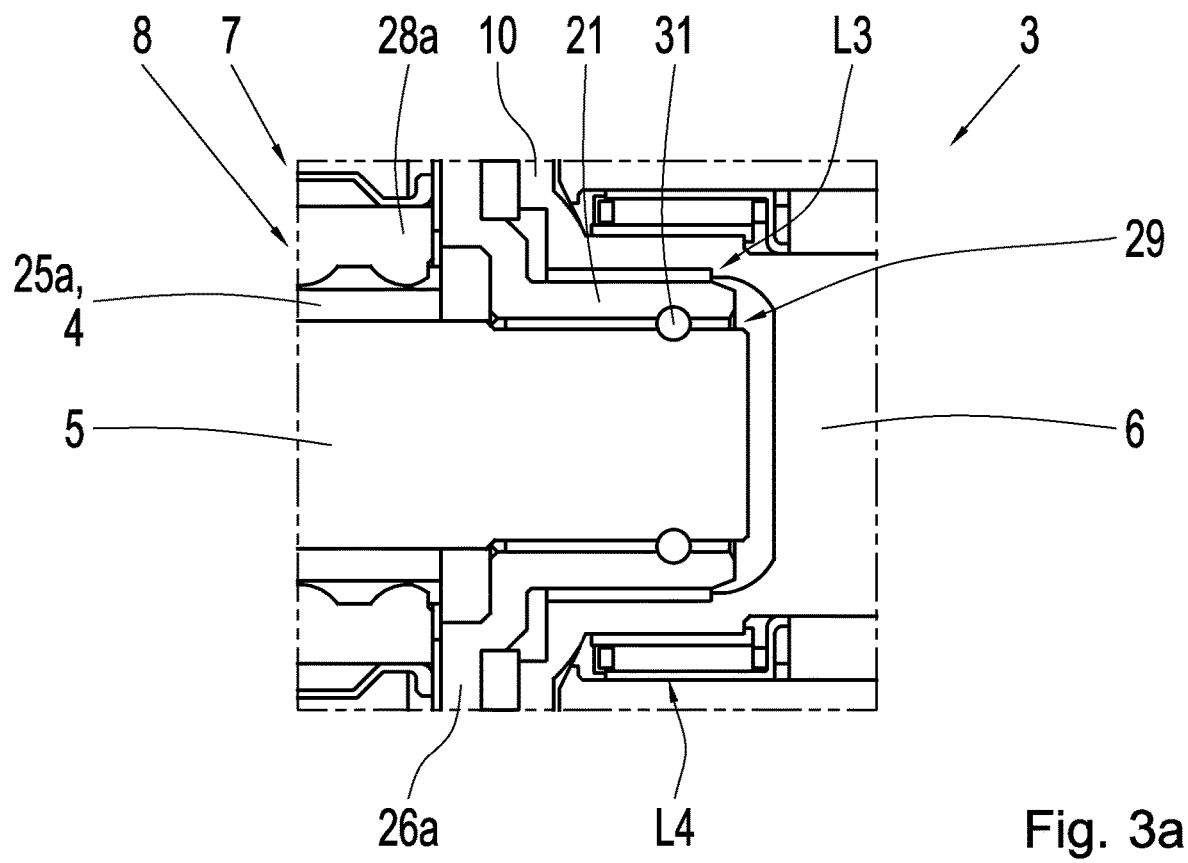
FIG. 3a shows a highly schematic partial sectional view of an axial fixation point of a planet carrier in a first planetary gear set in the transmission according to FIG. 1 and FIG. 2.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a vehicle 1 with two axles 11a, 11b, a power train 2 according to example aspects of the invention being drivingly arranged at the first axle 11a. The vehicle 1 is an electric vehicle in this case, the vehicle 1 being driven purely electrically. The first axle 11a can be either a front axle or a rear axle of the vehicle 1 and forms a driven axle of the vehicle 1. The power train 2 includes a drive unit 22, which is in the form of an electric machine, and a transmission 3 operatively connected thereto. The design and the arrangement of the transmission 3 are explained in greater detail in the following figures. The design of the drive unit 22 is not shown here. The drive unit 22 or the electric machine also has an accumulator, which supplies the drive unit 22 with electrical energy, and a power electronics system for the open-loop control and closed-loop control of the drive unit 22. A rotor (not shown here), which is arranged so as to be rotatable with respect to the stator and is connected, as a drive shaft, to an input shaft 4 (shown in FIG. 2) in the transmission 3 for conjoint rotation, is set into a rotational movement in relation to the stator by energizing a stator (not shown here). The drive power of the drive unit 22 is directed via the input shaft 4 into the transmission 3 and there is converted by an integral differential 7 and at least indirectly divided onto a first output shaft 5 and a second output shaft 6. The drive unit 22 is coaxial to the integral differential 7.

A wheel 18 is at least indirectly connected at each of the ends of the output shafts 5, 6, which are coaxial to each other in the present case, in order to drive the vehicle 1. Joints and wheel hubs can be arranged between the respective wheel 18 and the output shafts 5, 6 in order to compensate for possible inclinations of the output shafts 5, 6. These are not shown or described in greater detail here.

The transmission 3 shown in greater detail in FIG. 2 is a differential gear. The output shafts 5, 6 are coaxial to each other and extend in opposite directions to the wheels 18 in FIG. 1, wherein the first output shaft 5 extends axially through the transmission 3, in particular through the integral differential 7, and through the drive unit 22.

The integral differential 7 has a first planetary gear set 8, which includes multiple gear set elements, and a second planetary gear set 9, which also includes multiple gear set elements and which is operatively connected to the first planetary gear set 8. A first output torque is transmittable onto the first output shaft 5 by the first planetary gear set 8. A support torque of the first planetary gear set 8 is convertible in the second planetary gear set 9 such that a second output torque, which corresponds to the first output torque, is transmittable onto the second output shaft 6.

In the present case, a first sun gear 25a as the first gear set element, a first planet carrier 26a as the second gear set element, and a first ring gear 27a as the third gear set element are arranged at the first planetary gear set 8, wherein multiple first planet gears 28a, which are meshed with the first sun gear 25a and the first ring gear 27a, are rotatably arranged on the first planet carrier 26a. The first output shaft 5 extends axially through the first sun gear 25a in the first planetary gear set 8. Therefore, the first sun gear 25a is formed as a ring gear and the input shaft 4 connected thereto is formed as a hollow shaft. The first sun gear 25a is fixedly seated on the input shaft 4 or is connected thereto for conjoint rotation. The first sun gear 25a and the input shaft 4 are connected to each other as one piece in this case.

Furthermore, a second sun gear 25b as the first gear set element, a second planet carrier 26b as the second gear set element, and a second ring gear 27b as the third gear set element are arranged at the second planetary gear set 9, wherein multiple second planet gears 28b, which are meshed with the second sun gear 25b and the second ring gear 27b, are rotatably arranged on the second planet carrier 26b.

The first planetary gear set 8 and the second planetary gear set 9 are each in the form of a negative planetary gear set and are radially nested and, therefore, arranged in a common plane, which extends perpendicularly to the axle 11a. Axial installation space is reduced as a result. The first planetary gear set 8 is arranged radially inside the second planetary gear set 9 in the present case.

The first planet carrier 26a in the first planetary gear set 8 is connected to the first output shaft 5 for conjoint rotation via a driving tooth system 29. The first ring gear 27a in the first planetary gear set 8 is connected via a coupling shaft 14 to the second sun gear 25b in the second planetary gear set 9 for conjoint rotation. The second planet carrier 26b in the second planetary gear set 9 is supported in a housing-fixed manner against the stationary component 13 which is the transmission housing in the present case. In addition, the second ring gear 27b in the second planetary gear set 9 is connected to the second output shaft 6 for conjoint rotation via a coupling element 10, which is formed as a ring gear carrier in this case.

It is explicitly pointed out that the assignment of the gear set elements to the elements in the particular planetary gear set 8, 9 can be arbitrarily interchanged. The particular connection of the sun gear, the planet carrier and the ring gear, as the gear set elements, is implemented including the sign as required for the ratios. Instead of a negative planetary gear set, the particular planetary gear set 8, 9 can also always be in the form of a positive planetary gear set by interchanging the connection of the planet carrier and the ring gear and increasing the absolute value of the stationary gear ratio by one (1). Correspondingly, the other way around is also possible.

It is also conceivable to arrange an additional transmission gearing (not shown here), which is in the form, for example, of a spur gear stage or a planetary transmission having one or multiple planetary gear set(s), between the drive unit 22 and the transmission 3 in order to increase an overall gear ratio of the drive and/or to implement an axial offset of the output shafts 5, 6, for example, when it is not possible to axially extend one of the output shafts 5, 6 through the drive unit 22.

According to FIG. 2, the input shaft 4 is mounted for rotation with respect to the stationary component 13 by a first bearing L1, which is a fixed bearing. In addition, the second output shaft 6 is mounted for rotation with respect to a stationary component 13, which is the transmission housing in this case, by a second bearing L2, which is a fixed bearing. Furthermore, the first output shaft 5 is mounted for rotation with respect to the stationary component 13 by a third bearing L5, which is a fixed bearing. It is pointed out that the drive unit 22 is arranged between the first bearing L1 and the third bearing L5 and is operatively connected to the input shaft 4. The first, the second, and the third bearings L1, L2, L5 are each grooved ball bearings in the present case, which transmit axial forces as well as radial forces. The first planet carrier 26a in the first planetary gear set 8 is mounted for rotation with respect to the second output shaft 6, the coupling element 10 and the second ring gear 28b in the second planetary gear set 27b via a radial bearing L3, which is a needle bearing. The radial bearing L3 can also be a plain bearing for reasons of installation space and costs. The coupling element 10 is also rotatably mounted on the stationary component 13 together with the second output shaft 6 and the second ring gear 28b via a floating bearing L4. The floating bearing L4 can be a plain bearing or an anti-friction bearing.

FIG. 3a shows a cutout portion of the integral differential 7 according to FIG. 2 in detail, wherein the first planet carrier 26a in the first planetary gear set 8 is axially fixed on the first output shaft 5 and, in fact, by a snap ring 31, which is arranged radially between an axial section 21 of the first planet carrier 26a in the first planetary gear set 8 and the first output shaft 5. The snap ring 31 is arranged in the area of the driving tooth system 29 and axially fixes the first planet carrier 26a on the first output shaft 5. As a result, an undesired axial displacement of the first planet carrier 26a in relation to the other gear set elements in the differential 7 due, for example, to meshing forces, is prevented. In this example, the provision of axial bearings for axially mounting the first planet carrier 26a can be dispensed with entirely.

FIG. 3b through FIG. 3g show further example design options for the axial fixation of the first planet carrier 26a in the first planetary gear set 8 with respect to the first output shaft 5, wherein the design options can be reasonably arbitrarily combined with one another. The advantage of all example embodiments for the axial fixation of the first planet carrier 26a of the first planetary gear set 8 in relation to the first output shaft 5 is that at least a portion of the axial bearings, preferably all axial bearings, for mounting the first planet carrier 26a of the first planetary gear set 8 can be dispensed with.

According to FIG. 3b through FIG. 3e and FIG. 3g, it is provided that the first planet carrier 26a in the first planetary gear set 8 is axially fixed on the first output shaft 5 by at least one retaining ring 32, 33.

Figure 3B:
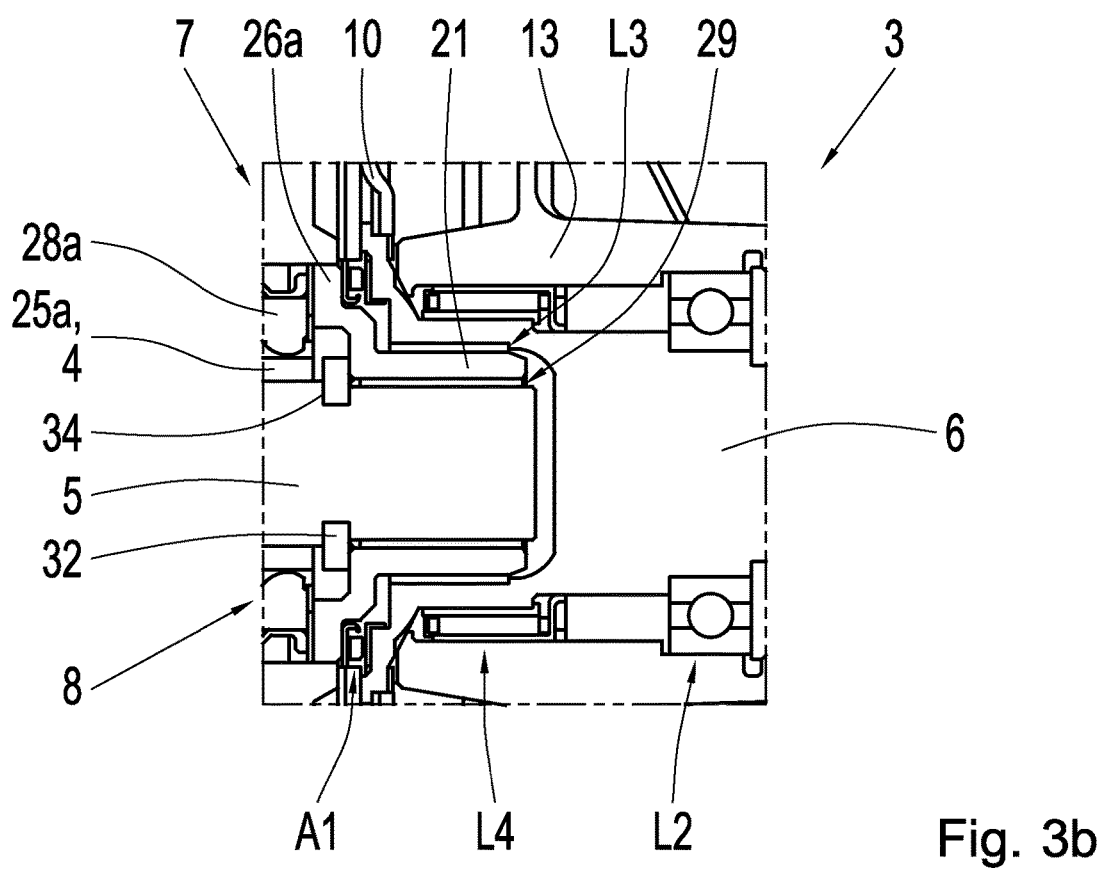
FIG. 3b shows a detailed schematic view of the axial fixation point of the planet carrier in the first planetary gear set according to a second example embodiment.

According to FIG. 3b, a first retaining ring 32 is accommodated to the left of the driving tooth system 29 in a first groove 34 formed on the first output shaft 5. As a result, the first planet carrier 26a in the first planetary gear set 8 can come to rest, toward the left, axially against the axially fixed, first retaining ring 32 and be supported against the first retaining ring 32. In the opposite axial direction, i.e., toward the right in this case, the first planet carrier 26a in the first planetary gear set 8 is mounted with respect to the stationary component 13 via only one single axial bearing A1. Further axial bearings can be dispensed with.

Figure 3C:
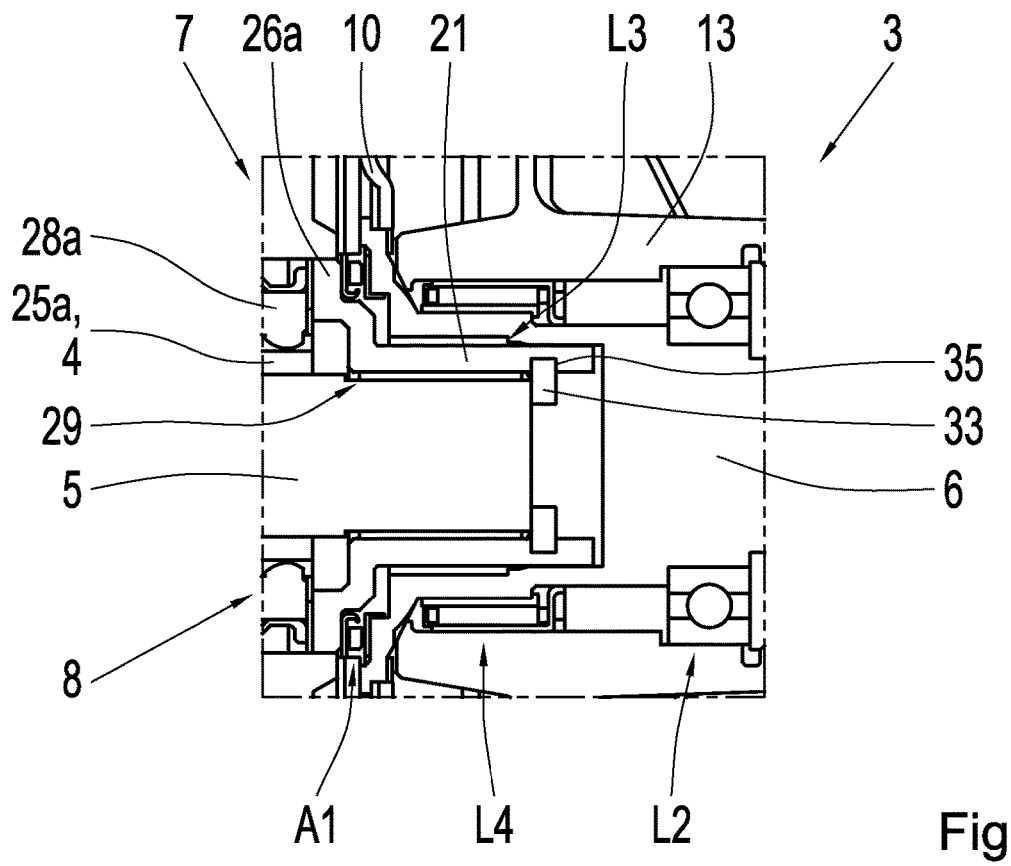
FIG. 3c shows a detailed schematic view of the axial fixation point of the planet carrier in the first planetary gear set according to a third example embodiment.

According to FIG. 3c, a second retaining ring 33 is accommodated to the right of the driving tooth system 29 in a second groove 35 formed on the axial section 21 of the first planet carrier 26a in the first planetary gear set 8. As a result, the first planet carrier 26a in the first planetary gear set 8 comes to rest via an end face against the first output shaft 5 and can be supported against the first output shaft 5. In the opposite axial direction, i.e., toward the right in this case, the first planet carrier 26a in the first planetary gear set 8 is mounted with respect to the stationary component 13 via only one single axial bearing A1. Further axial bearings can be dispensed with.

Figure 3D:
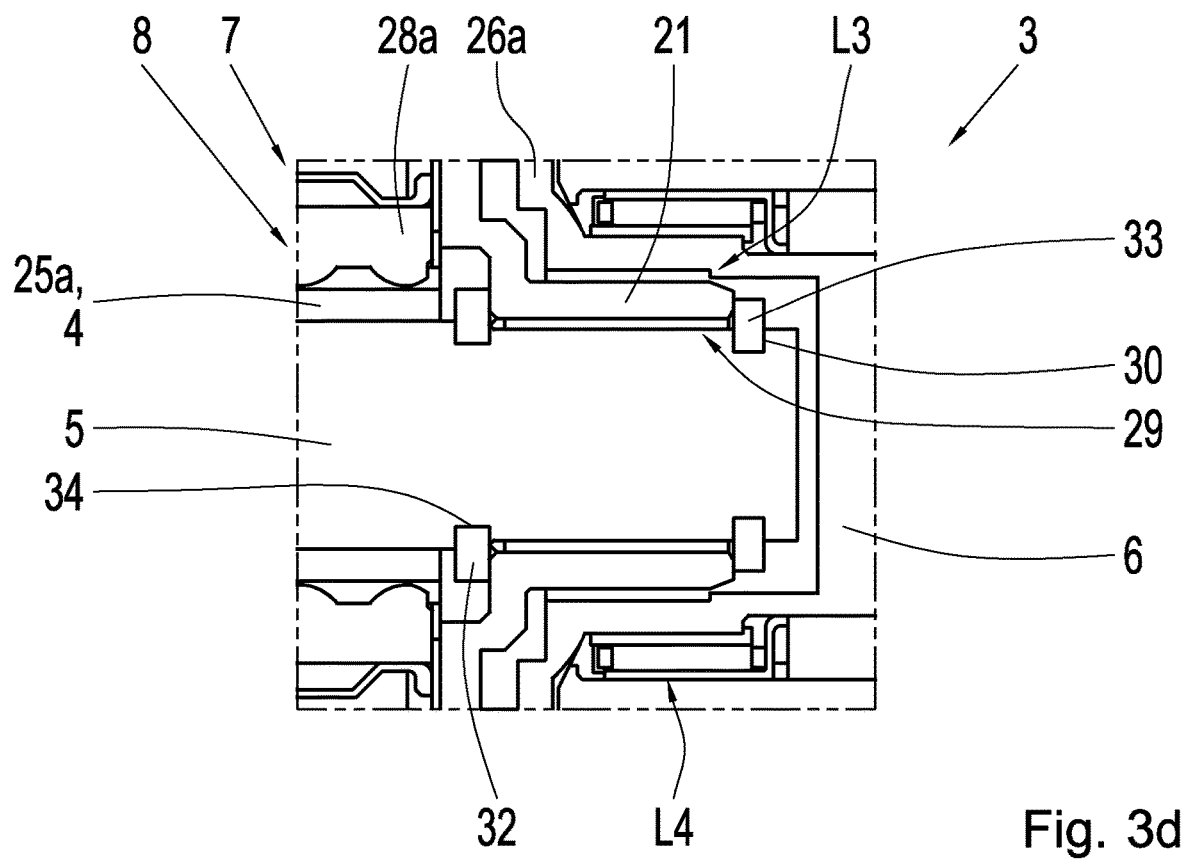
FIG. 3d shows a detailed schematic view of the axial fixation point of the planet carrier in the first planetary gear set according to a fourth example embodiment.

The axial fixation of the first planet carrier 26a in the first planetary gear set 8 according to FIG. 3d is based, in the first axial direction, on the embodiment according to FIG. 3b, and so reference is made to the comments presented with respect to FIG. 3b. In this example, a third groove 30, in which a second retaining ring 33 is accommodated, is also formed to the right of the driving tooth system 29. In other words, the driving tooth system 29 and the axial section 21 of the first planet carrier 26a in the first planetary gear set 8 are arranged axially between two grooves 34, 30, wherein the first planet carrier 26a in the first planetary gear set 8 is held in its axial position in relation to the first output shaft 5 by the retaining ring 33. In this case, axial bearings for mounting the first planet carrier 26a can be dispensed with.

Figure 3E:
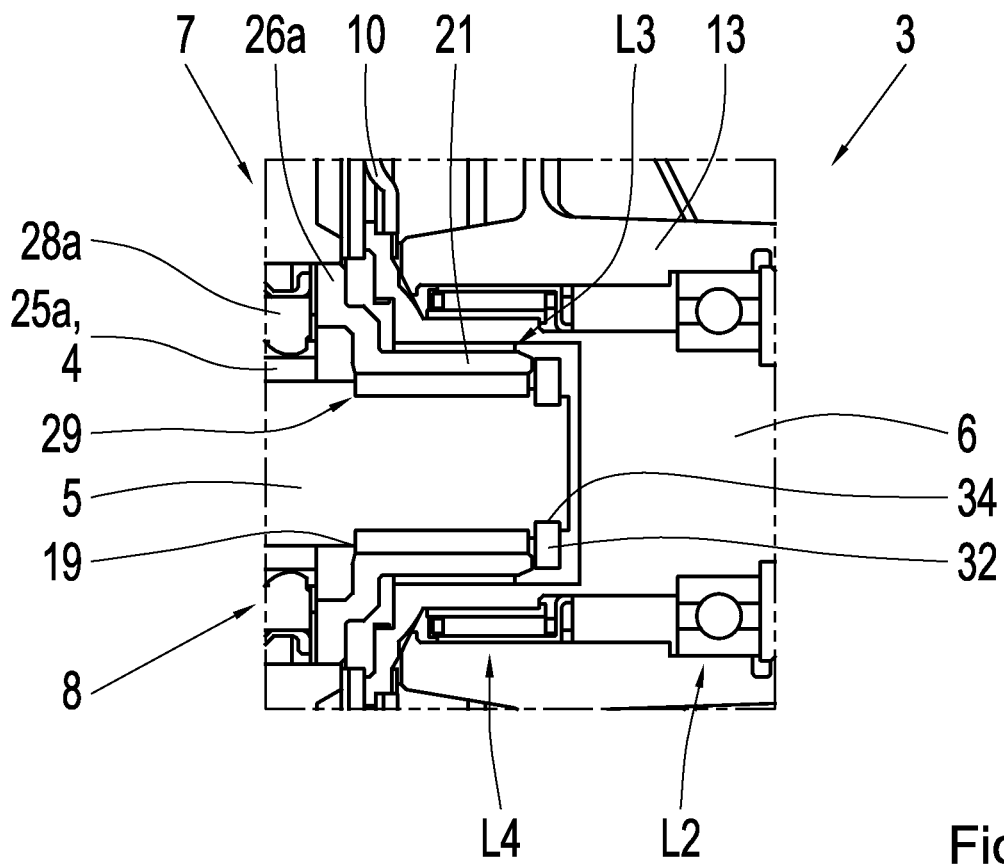
FIG. 3e shows a detailed schematic view of the axial fixation point of the planet carrier in the first planetary gear set according to a fifth example embodiment.

FIG. 3e shows a single retaining ring 32 to the right of the driving tooth system 29. The retaining ring 32 is accommodated in a first groove 34 formed on the first output shaft 5. As a result, the first planet carrier 26a in the first planetary gear set 8 can come to rest, toward the right, axially against the axially fixed, first retaining ring 32 and be supported against the first retaining ring 32. To the left of the driving tooth system 29, the first output shaft 5 has a circumferential first shoulder 19, against which the first planet carrier 26a in the first planetary gear set 8 is axially supported toward the left. The first output shaft 5 therefore has at least two sections with different outer diameters. The axial section 21 of the first planet carrier 26a in the first planetary gear set 8 is arranged axially between the first shoulder 19 and the first retaining ring 32. In this case, axial bearings for mounting the first planet carrier 26a can be dispensed with.

Figure 3F:
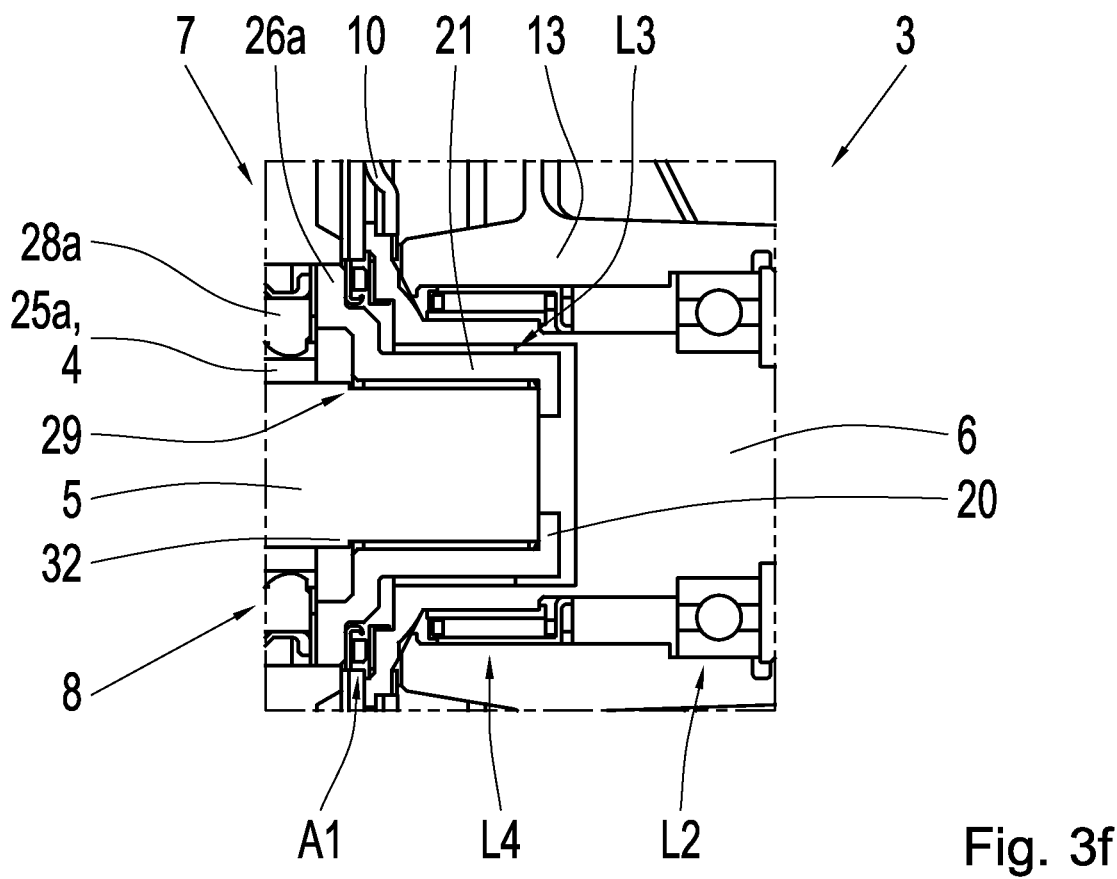
FIG. 3f shows a detailed schematic view of the axial fixation point of the planet carrier in the first planetary gear set according to a sixth example embodiment.

According to FIG. 3f, an axial fixation of the first planet carrier 26a in the first planetary gear set 8 is implemented by a second shoulder 20, which can be generated via plastic shaping. The second shoulder 20 is a local taper of an inner diameter of the first planet carrier 26a on the axial section 21. Via the second shoulder 20, the first planet carrier 26a in the first planetary gear set 8 comes to rest via an end face against the first output shaft 5. The second shoulder 20 forms an axial stop. In the opposite axial direction, i.e., toward the right in this case, the first planet carrier 26a in the first planetary gear set 8 is mounted with respect to the second output shaft 6 via only one single axial bearing A1. Further axial bearings can be dispensed with.

Figure 3G:
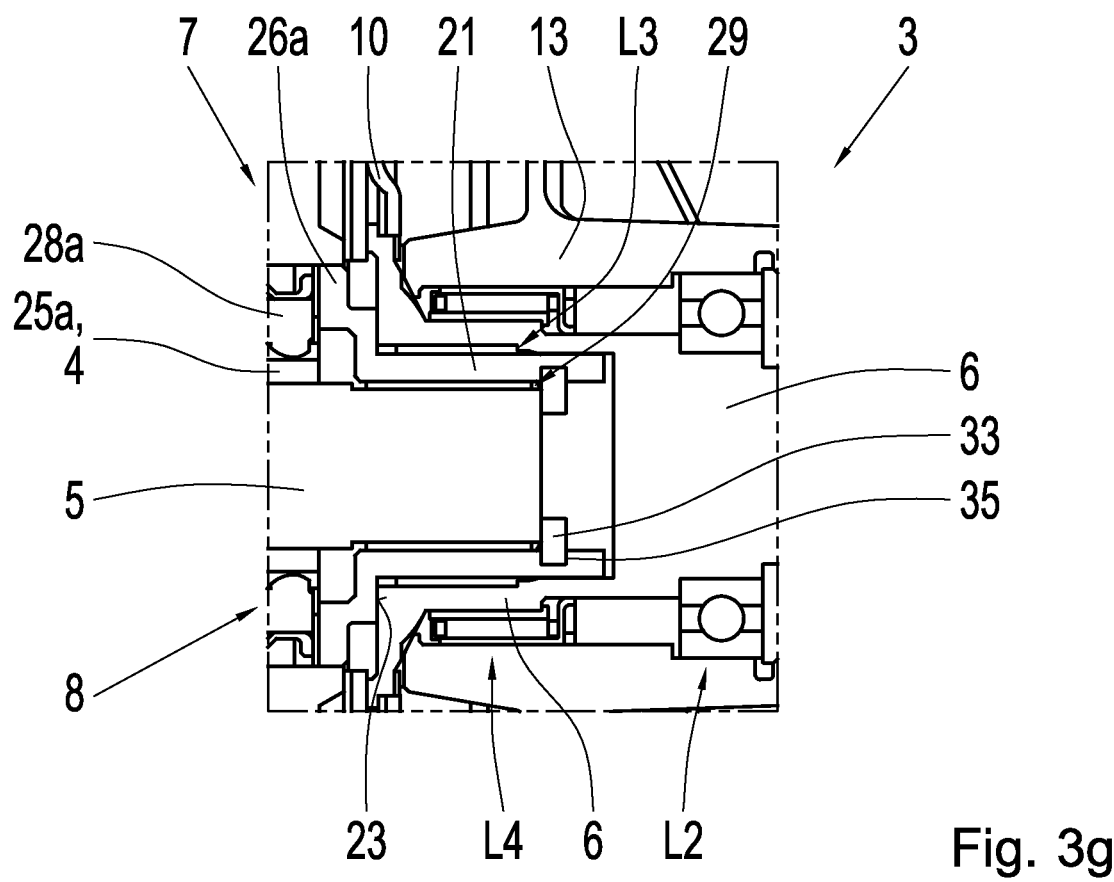
FIG. 3g shows a detailed schematic view of the axial fixation point of the planet carrier in the first planetary gear set according to a seventh example embodiment.

The axial fixation of the first planet carrier 26a in the first planetary gear set 8 according to FIG. 3g is based, in the first axial direction, on the embodiment according to FIG. 3c, and so reference is made to the comments presented with respect to FIG. 3c. In this example, a circumferential third shoulder 23 is also formed on the first planet carrier 26a in the first planetary gear set 8. The third shoulder 23 comes to rest via an end face against the second output shaft 6. The third shoulder 23 is an axial stop, which simultaneously acts as a plain bearing, such that the first planet carrier 26a can turn in relation to the second output shaft 6, or vice versa. In this case, axial bearings for mounting the first planet carrier 26a can be dispensed with.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 vehicle
2 power train
3 transmission
4 input shaft
5 first output shaft
6 second output shaft
7 differential
8 first planetary gear set
9 second planetary gear set
10 coupling element
11a first axle
11b second axle
12 epicyclic gear train
13 stationary component
14 coupling shaft
18 wheel
19 first shoulder
20 second shoulder
21 axial section of the first planet carrier in the first planetary gear set
22 drive unit
23 third shoulder
25a first sun gear in the first planetary gear set
25b second sun gear in the second planetary gear set
26a first planet carrier in the first planetary gear set
26b second planet carrier in the second planetary gear set
27a first ring gear in the first planetary gear set
27b second ring gear in the second planetary gear set
28a first planet gear in the first planetary gear set
28b second planet gear in the second planetary gear set
29 driving tooth system
30 third groove
31 snap ring
32 first retaining ring
33 second retaining ring
34 first groove
35 second groove
A1 axial bearing
L1 first bearing
L2 second bearing
L3 radial bearing
L4 floating bearing
L5 third bearing

The invention claimed is:

1. A transmission (3) for a power train (2) of a vehicle (1), comprising:
an input shaft (4);
a first output shaft (5);
a second output shaft (6); and
a differential (7) operatively arranged between the input shaft (4) and the first and second output shafts (5, 6), the differential (7) comprising a first planetary gear set (8) and a second planetary gear set (9), the first planetary gear set (8) comprising a first gear set element, a second gear set element, and a third gear set element, a first output torque being at least indirectly transmittable onto the first output shaft (5) by the first planetary gear set (8), the second planetary gear set (9) comprising a first gear set element, a second gear set element, and a third gear set element, the second planetary gear set (9) operatively connected to the first planetary gear set (8), a support torque of the first planetary gear set (8) being convertible in the second planetary gear set (9) such that a second output torque corresponding to the first output torque is transmittable onto the second output shaft (6),
wherein the first gear set element of the first planetary gear set (8) is connected to the input shaft (4) for conjoint rotation, the second gear set element of the first planetary gear set (8) is at least indirectly connected to the first output shaft (5) for conjoint rotation, and the third gear set element of the first planetary gear set (8) is at least indirectly connected to the first gear set element of the second planetary gear set (9) for conjoint rotation, the second gear set element of the second planetary gear set (9) is connected to a stationary component (13) for conjoint rotation, and the third gear set element of the second planetary gear set (9) is at least indirectly connected to the second output shaft (6) for conjoint rotation, and wherein the second gear set element of the first planetary gear set (8) is axially fixed at least in one axial direction on the first output shaft (5) by a retaining ring (31, 32, 33).

2. The transmission (3) of claim 1, wherein the first planetary gear set (8) is arranged at least partially, radially inside the second planetary gear set (9).

3. The transmission (3) of claim 1, wherein the third gear set element of the second planetary gear set (9) is connected to the second output shaft (6) for conjoint rotation via a coupling element (10).

4. The transmission (3) of claim 1, further comprising a radial bearing (L3), the second gear set element of the first planetary gear set (8) mounted via the radial bearing (L3) for rotation at least indirectly with respect to the second output shaft (6).

5. The transmission (3) of claim 1, wherein the retaining ring comprises a snap ring (31) axially fixing the second gear set element of the first planetary gear set (8), the snap ring (31) arranged radially between the second gear set element of the first planetary gear set (8) and the first output shaft (5).

6. The transmission (3) of claim 1, wherein a first retaining ring (32) of the at least one retaining ring (32, 33) is accommodated in a first groove (34) formed on the first output shaft (5), and the second gear set element of the first planetary gear set (8) is axially supported against the first retaining ring (32).

7. The transmission (3) of claim 1, wherein a second retaining ring (33) of the at least one retaining ring (32, 33) is accommodated in a second groove (35) formed on the second gear set element of the first planetary gear set (8), and the second gear set element of the first planetary gear set (8) is supported axially against the first output shaft (5) via the second retaining ring (33).

8. The transmission (3) of claim 1, wherein an at least partially circumferential first shoulder (19) is formed on the first output shaft (5), and the second gear set element of the first planetary gear set (8) is axially supported against the first shoulder (19) of the first output shaft (5).

9. The transmission (3) of claim 1, wherein an at least partially circumferential second shoulder (20) is formed on the second gear set element of the first planetary gear set (8), and an end face of the second shoulder (20) rests against the first output shaft (5).

10. The transmission (3) of claim 1, wherein an at least partially circumferential third shoulder (23) is formed on the second gear set element of the first planetary gear set (8), and an end face of the third shoulder (23) at least indirectly rest against the second output shaft (6).

11. The transmission (3) of claim 1, wherein the first gear set element of each of the first and second planetary gear sets (8, 9) is a respective sun gear, the second gear set element of each of the first and second planetary gear sets (8, 9) is a respective planet carrier, and the third gear set element of each of the first and second planetary gear sets (8, 9) is a respective ring gear.

12. The transmission (3) of claim 1, wherein each of the first and second planetary gear sets (8, 9) is either a negative planetary gear set or a positive planetary gear set.

13. A power train (2) for a vehicle (1), comprising the transmission (3) of claim 1.

14. The transmission of claim 1, further comprising:
a first bearing (L1);
a second bearing (L2); and
a third bearing (L5),
wherein the second bearing (L2) is arranged between the second output shaft (6) and the stationary component (13) and delimits the axial position of the second output shaft (6) with respect to the stationary component (13) at least in one axial direction.

15. The transmission (3) of claim 14, wherein one or both of:
the input shaft (4) is mounted for rotation with respect to the stationary component (13) by the first bearing (L1); and
the first output shaft (5) is mounted for rotation with respect to the stationary component (13) by the third bearing (L5).

16. A transmission (3) for a power train (2) of a vehicle (1), comprising:
an input shaft (4);
a first output shaft (5);
a second output shaft (6); and
a differential (7) operatively arranged between the input shaft (4) and the first and second output shafts (5, 6), the differential (7) comprising a first planetary gear set (8) and a second planetary gear set (9), the first planetary gear set (8) comprising a first gear set element, a second gear set element, and a third gear set element, a first output torque being at least indirectly transmittable onto the first output shaft (5) by the first planetary gear set (8), the second planetary gear set (9) comprising a first gear set element, a second gear set element, and a third gear set element, the second planetary gear set (9) operatively connected to the first planetary gear set (8), a support torque of the first planetary gear set (8) being convertible in the second planetary gear set (9) such that a second output torque corresponding to the first output torque is transmittable onto the second output shaft (6), wherein the first gear set element of the first planetary gear set (8) is connected to the input shaft (4) for conjoint rotation, the second gear set element of the first planetary gear set (8) is at least indirectly connected to the first output shaft (5) for conjoint rotation, and the third gear set element of the first planetary gear set (8) is at least indirectly connected to the first gear set element of the second planetary gear set (9) for conjoint rotation, the second gear set element of the second planetary gear set (9) is connected to a stationary component (13) for conjoint rotation, and the third gear set element of the second planetary gear set (9) is at least indirectly connected to the second output shaft (6) for conjoint rotation, wherein the second gear set element of the first planetary gear set (8) is axially fixed at least in one axial direction on the first output shaft (5), and wherein an at least partially circumferential second shoulder (20) is formed on the second gear set element of the first planetary gear set (8), and an end face of the second shoulder (20) rests against the first output shaft (5).

17. A transmission (3) for a power train (2) of a vehicle (1), comprising:
- an input shaft (4);
- a first output shaft (5);
- a second output shaft (6); and
- a differential (7) operatively arranged between the input shaft (4) and the first and second output shafts (5, 6), the differential (7) comprising a first planetary gear set (8) and a second planetary gear set (9), the first planetary gear set (8) comprising a first gear set element, a second gear set element, and a third gear set element, a first output torque being at least indirectly transmittable onto the first output shaft (5) by the first planetary gear set (8), the second planetary gear set (9) comprising a first gear set element, a second gear set element, and a third gear set element, the second planetary gear set (9) operatively connected to the first planetary gear set (8), a support torque of the first planetary gear set (8) being convertible in the second planetary gear set (9) such that a second output torque corresponding to the first output torque is transmittable onto the second output shaft (6), wherein the first gear set element of the first planetary gear set (8) is connected to the input shaft (4) for conjoint rotation, the second gear set element of the first planetary gear set (8) is at least indirectly connected to the first output shaft (5) for conjoint rotation, and the third gear set element of the first planetary gear set (8) is at least indirectly connected to the first gear set element of the second planetary gear set (9) for conjoint rotation, the second gear set element of the second planetary gear set (9) is connected to a stationary component (13) for conjoint rotation, and the third gear set element of the second planetary gear set (9) is at least indirectly connected to the second output shaft (6) for conjoint rotation, wherein the second gear set element of the first planetary gear set (8) is axially fixed at least in one axial direction on the first output shaft (5), and wherein an at least partially circumferential third shoulder (23) is formed on the second gear set element of the first planetary gear set (8), and an end face of the third shoulder (23) at least indirectly rest against the second output shaft (6).

* * * * *